US010502551B2

(12) United States Patent
Germann et al.

(10) Patent No.: US 10,502,551 B2
(45) Date of Patent: Dec. 10, 2019

(54) METHODS FOR MONITORING COMPONENTS USING MICRO AND MACRO THREE-DIMENSIONAL ANALYSIS

(71) Applicant: General Electric Company, Schenectady, NY (US)

(72) Inventors: Bryan J. Germann, Greenville, SC (US); Gregory Lee Hovis, Martinez, GA (US)

(73) Assignee: General Electric Company, Schenectady, NY (US)

( * ) Notice: Subject to any disclaimer, the term of this patent is extended or adjusted under 35 U.S.C. 154(b) by 423 days.

(21) Appl. No.: 15/450,089

(22) Filed: Mar. 6, 2017

(65) Prior Publication Data
US 2018/0252515 A1 Sep. 6, 2018

(51) Int. Cl.
*G01B 11/16* (2006.01)
*G01M 15/14* (2006.01)
(Continued)

(52) U.S. Cl.
CPC .............. *G01B 11/16* (2013.01); *F01D 5/005* (2013.01); *F01D 21/003* (2013.01);
(Continued)

(58) Field of Classification Search
CPC ...... G01B 11/16; G01M 15/14; Y02T 50/673; F05D 2270/332; F05D 2260/94;
(Continued)

(56) References Cited

U.S. PATENT DOCUMENTS

| 4,528,856 A | 7/1985 | Junket et al. |
| 4,746,858 A | 5/1988 | Metala et al. |

(Continued)

FOREIGN PATENT DOCUMENTS

| EP | 1 293 754 A1 | 3/2003 |
| EP | 1 760 427 A2 | 3/2007 |

(Continued)

OTHER PUBLICATIONS

Extended European Search Report and Opinion issued in connection with corresponding EP Application No. 18158111.7 dated Jul. 16, 2018.

*Primary Examiner* — Mischita L Henson
(74) *Attorney, Agent, or Firm* — Dority & Manning, P.A.

(57) ABSTRACT

A method of monitoring a component includes providing the component which includes a body having an exterior surface and a plurality of passive strain indicators configured on the exterior surface. The method includes directly measuring the component with at least one three-dimensional data acquisition device. The direct measurement generates a first point cloud and a plurality of second point clouds. The first point cloud corresponds to the exterior surface and includes a plurality of first data points, each data point having an X-axis coordinate, a Y-axis coordinate, and a Z-axis coordinate. Each second point cloud corresponds to one of the plurality of passive strain indicators and includes a plurality of second data points, each data point having an X-axis coordinate, a Y-axis coordinate, and a Z-axis coordinate. A second data point density of each second point cloud is greater than a first data point density of each first point cloud.

20 Claims, 7 Drawing Sheets

(51) Int. Cl.
  *F01D 5/00*   (2006.01)
  *F01D 21/00*  (2006.01)

(52) U.S. Cl.
  CPC ......... *G01M 15/14* (2013.01); *F05D 2250/74* (2013.01); *F05D 2260/80* (2013.01); *F05D 2260/83* (2013.01); *F05D 2260/94* (2013.01); *F05D 2270/332* (2013.01); *Y02T 50/673* (2013.01)

(58) Field of Classification Search
  CPC ............. F05D 2250/74; F05D 2260/80; F05D 2260/83; F01D 21/003; F01D 5/005
  See application file for complete search history.

(56) References Cited

U.S. PATENT DOCUMENTS

| | | | |
|---|---|---|---|
| 4,782,705 A | 11/1988 | Hoffmann et al. | |
| 4,859,062 A | 8/1989 | Thurn et al. | |
| 6,078,396 A | 6/2000 | Mauzouri | |
| 6,175,644 B1 | 1/2001 | Scola et al. | |
| 6,574,363 B1 | 6/2003 | Classen et al. | |
| 6,983,659 B2 | 1/2006 | Soechting et al. | |
| 6,986,287 B1 | 1/2006 | Dorfman | |
| 7,200,259 B1 | 4/2007 | Gold et al. | |
| 7,227,648 B2 | 6/2007 | Weinhold | |
| 7,414,732 B2 | 8/2008 | Maidhof et al. | |
| 7,421,370 B2 | 9/2008 | Jain et al. | |
| 7,441,464 B2 | 10/2008 | Turnbull et al. | |
| 7,477,995 B2 | 1/2009 | Hovis et al. | |
| 7,490,522 B2 | 2/2009 | Ruehrig et al. | |
| 7,533,818 B2 | 5/2009 | Hovis et al. | |
| 7,689,003 B2 | 3/2010 | Shannon et al. | |
| 7,697,966 B2 | 4/2010 | Monfre et al. | |
| 7,849,752 B2* | 12/2010 | Gregory | G01B 7/22 73/760 |
| 8,245,578 B2 | 8/2012 | Ranson et al. | |
| 8,307,715 B2 | 11/2012 | Ranson | |
| 8,511,182 B2 | 8/2013 | Bjerge et al. | |
| 8,600,147 B2 | 12/2013 | Iliopoulos et al. | |
| 8,818,078 B2 | 8/2014 | Telfer et al. | |
| 8,994,845 B2 | 3/2015 | Mankowski | |
| 9,128,063 B2 | 9/2015 | Dooley | |
| 9,200,889 B2 | 12/2015 | Swiergiel et al. | |
| 9,207,154 B2 | 12/2015 | Harding et al. | |
| 9,311,566 B2 | 4/2016 | Iliopoulos et al. | |
| 9,316,571 B2 | 4/2016 | Müller et al. | |
| 2013/0013224 A1 | 6/2013 | Ito et al. | |
| 2013/0194567 A1 | 8/2013 | Wan et al. | |
| 2014/0000380 A1 | 1/2014 | Slowik et al. | |
| 2014/0267677 A1 | 9/2014 | Ward, Jr. et al. | |
| 2015/0239043 A1 | 8/2015 | Shipper, Jr. et al. | |
| 2016/0161242 A1 | 6/2016 | Cook et al. | |
| 2016/0305769 A1 | 10/2016 | Burnside et al. | |
| 2016/0313114 A1 | 10/2016 | Tohme et al. | |
| 2016/0354174 A1 | 12/2016 | Demir | |
| 2017/0122726 A1* | 5/2017 | Burnside | G01B 11/16 |
| 2017/0167859 A1* | 6/2017 | Burnside | G01B 11/165 |
| 2018/0202799 A1* | 7/2018 | Tollison | G01B 11/165 |

FOREIGN PATENT DOCUMENTS

| | | |
|---|---|---|
| EP | 2 881 731 A1 | 6/2015 |
| EP | 3 081 899 A1 | 10/2016 |
| WO | WO 2014/031957 | 2/2014 |
| WO | 2014/165595 A1 | 10/2014 |

\* cited by examiner

METHODS FOR MONITORING COMPONENTS USING MICRO AND MACRO THREE-DIMENSIONAL ANALYSIS

FIELD

The present disclosure relates generally to methods for monitoring component deformation, and more particularly to monitoring methods which use simultaneously obtained micro and macro three-dimensional data sets.

BACKGROUND

Throughout various industrial applications, apparatus components are subjected to numerous extreme conditions (e.g., high temperatures, high pressures, large stress loads, etc.). Over time, an apparatus's individual components may suffer deformation that may reduce the component's usable life. Such concerns might apply, for instance, to some turbomachines.

Turbomachines are widely utilized in fields such as power generation and aircraft engines. For example, a conventional gas turbine system includes a compressor section, a combustor section, and at least one turbine section. The compressor section is configured to compress a working fluid (e.g., air) as the working fluid flows through the compressor section. The compressor section supplies a high pressure compressed working fluid to the combustors where the high pressure working fluid is mixed with a fuel and burned in a combustion chamber to generate combustion gases having a high temperature and pressure. The combustion gases flow along a hot gas path into the turbine section. The turbine section utilizes the combustion gases by extracting energy therefrom to produce work. For example, expansion of the combustion gases in the turbine section may rotate a shaft to power the compressor, an electrical generator, and other various loads.

During operation of a turbomachine, various components within the turbomachine, and particularly components along the hot gas path such as turbine blades within the turbine section of the turbomachine, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

BRIEF DESCRIPTION

Aspects and advantages of the invention will be set forth in part in the following description, or may be obvious from the description, or may be learned through practice of the invention.

In accordance with one embodiment, a method of monitoring a component is provided. The component includes an exterior surface and a plurality of passive strain indicators configured on the exterior surface. The method includes initially directly measuring the component with at least one three-dimensional data acquisition device. The initial direct measurement generates a first point cloud and a plurality of second point clouds. The first point cloud corresponds to the exterior surface and includes a plurality of first data points, each data point having an X-axis coordinate, a Y-axis coordinate, and a Z-axis coordinate. Each second point cloud corresponds to one of the plurality of passive strain indicators and includes a plurality of second data points, each data point having an X-axis coordinate, a Y-axis coordinate, and a Z-coordinate, wherein a second data point density of each second point cloud is greater than a first data point density of the first point cloud. The method further includes subjecting the component to at least one duty cycle. The method further includes subsequently directly measuring the component with the at least one three-dimensional data acquisition device. The subsequent direct measurement generates a third point cloud and a plurality of fourth point clouds. The third point cloud corresponds to the exterior surface and includes a plurality of third data points, each data point having an X-axis coordinate, a Y-axis coordinate, and a Z-axis coordinate. Each fourth point cloud corresponds to one of the plurality of passive strain indicators and includes a plurality of fourth data points, each data point having an X-axis coordinate, a Y-axis coordinate, and a Z-axis coordinate, wherein a fourth data point density of each fourth point cloud is greater than a third data point density of each third point cloud. The method further includes comparing the first point cloud to the third point cloud to evaluate global deformation of the component, and comparing the second point cloud to the fourth point cloud for each passive strain indicator to evaluate local deformation of each of the plurality of passive strain indicators.

In accordance with another embodiment, a method of monitoring a component is provided. The method includes providing the component, the component including a body having an exterior surface and a plurality of passive strain indicators configured on the exterior surface. The method further includes directly measuring the component with at least one three-dimensional data acquisition device. The direct measurement generates a first point cloud and a plurality of second point clouds. The first point cloud corresponds to the exterior surface and includes a plurality of first data points, each data point having an X-axis coordinate, a Y-axis coordinate, and a Z-axis coordinate. Each second point cloud corresponds to one of the plurality of passive strain indicators and includes a plurality of second data points, each data point having an X-axis coordinate, a Y-axis coordinate, and a Z-axis coordinate. A second data point density of each second point cloud is greater than a first data point density of each first point cloud.

In accordance with another embodiment, a system for monitoring a component is provided. The system includes a component, the component including a body having an exterior surface and a plurality of passive strain indicators configured on the exterior surface. The component further includes at least one three-dimensional data acquisition device, the at least one three-dimensional data acquisition device configured to directly measure the component. The component further includes a processor in operable communication with the at least one data acquisition device. The processor is configured to generate a first point cloud and a plurality of second point clouds based on the direct measurement of the component. The first point cloud corresponds to the exterior surface and includes a plurality of first data points, each data point having an X-axis coordinate, a Y-axis coordinate, and a Z-axis coordinate. Each second point cloud corresponds to one of the plurality of passive strain indicators and includes a plurality of second data points, each data point having an X-axis coordinate, a Y-axis coordinate, and a Z-axis coordinate. A second data point density of each second point cloud is greater than a first data point density of the first point cloud.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
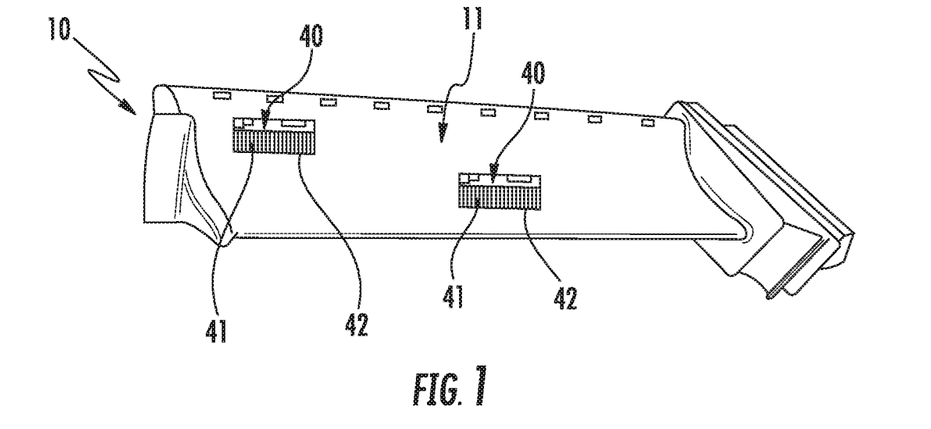
FIG. 1 is a perspective view of a component with passive strain indicators configured on an exterior surface of the component in accordance with embodiments of the present disclosure.

Referring now to FIG. 1, a component 10 is illustrated with a passive strain indicator 40 configured on a portion of the exterior surface 11 of the component's body. The component 10 can comprise a variety of specific components such as those utilized in high temperature applications (e.g., components comprising nickel or cobalt based superalloys). In some embodiments, the component 10 may comprise a turbine component, such as an industrial gas turbine or steam turbine component such as a combustion component or hot gas path component. In some embodiments, such as the embodiment illustrated in FIG. 1, the component 10 may comprise a turbine blade, compressor blade, vane, nozzle, shroud, rotor, transition piece or casing. In other embodiments, the component 10 may comprise any other component of a turbine such as any other component for a gas turbine, steam turbine or the like. In other embodiments, the component may comprise a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

The component 10 has an exterior surface 11 on which passive strain indicators 40 are configured. Passive strain indicators 40 in accordance with the present disclosure may be configured on the exterior surface 11 using any suitable techniques, including deposition techniques; other suitable additive manufacturing techniques; subtractive techniques such as laser ablation, engraving, machining, etc.; appearance-change techniques such as annealing, direct surface discoloration, or techniques to cause local changes in reflectivity; mounting of previously formed passive strain indicators 40 using suitable mounting apparatus or techniques such as adhering, welding, brazing, etc.; or identifying pre-existing characteristics of the exterior surface 11 that can function as the components of a passive strain indicator 40.

Figure 2:
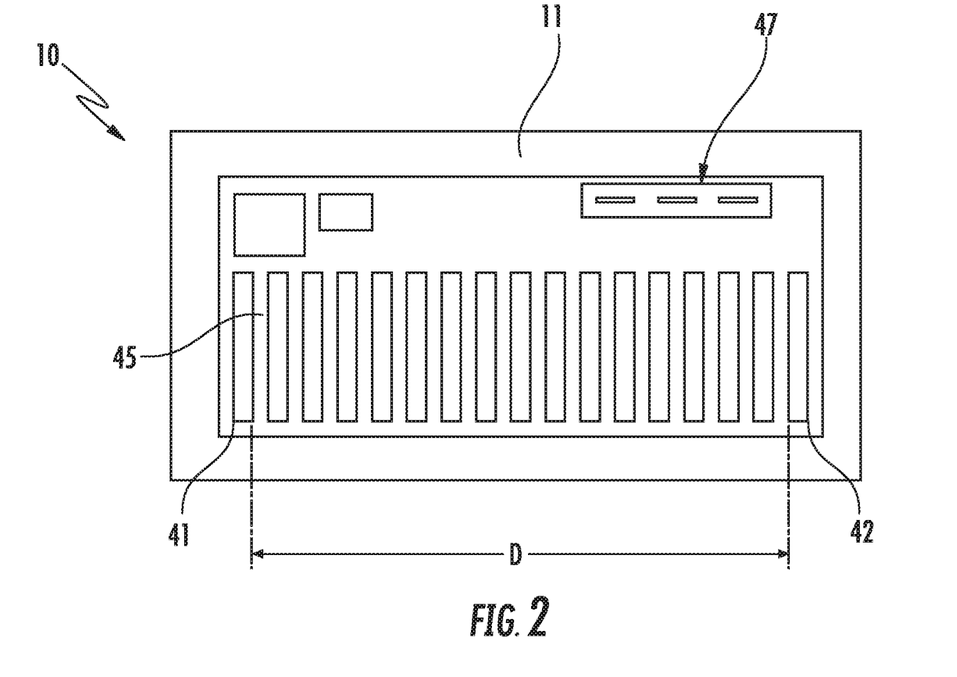
FIG. 2 is a plan view of a passive strain indicator in accordance with embodiments of the present disclosure.

Referring now to FIGS. 1 and 2, a plurality of passive strain indicators 40 are configured on a portion of the exterior surface 11 of the component 10. Each passive strain indicator 40 generally comprises at least two reference points 41 and 42 that can be used to measure a distance D between said at least two reference points 41 and 42 at a plurality of time intervals. As should be appreciated to those skilled in the art, these measurements can help determine the amount of strain, strain rate, creep, fatigue, stress, etc. at that region of the component 10. The at least two reference points 41 and 42 can be disposed at a variety of distances and in a variety of locations depending on the specific component 10 so long as the distance D there between can be measured. Moreover, the at least two reference points 41 and 42 may comprise dots, lines, circles, boxes or any other geometrical or non-geometrical shape so long as they are consistently identifiable and may be used to measure the distance D there between.

The passive strain indicator 40 may comprise a variety of different configurations and cross-sections such as by incorporating a variety of differently shaped, sized, and positioned reference points 41 and 42. For example, as illustrated in FIG. 2, the passive strain indicator 40 may comprise a variety of different reference points comprising various shapes and sizes. Such embodiments may provide for a greater variety of distance measurements D such as between the outer most reference points (as illustrated), between two internal or external reference points, or any combination there between. The greater variety may further provide a more robust strain analysis on a particular portion of the component 10 by providing strain measurements across a greater variety of locations.

Furthermore, the dimensions of the passive strain indicator 40 may depend on, for example, the component 10, the location of the passive strain indicator 40, the targeted precision of the measurement, application technique, and optical measurement technique. For example, in some embodiments, the passive strain indicator 40 may comprise a length and width ranging from less than 1 millimeter to greater than 300 millimeters. Moreover, the passive strain indicator 40 may comprise any thickness that is suitable for application and subsequent optical identification without significantly impacting the performance of the underlying component 10. Notably, this thickness may be a positive thickness away from the surface 11 (such as when additive techniques are utilized) or a negative thickness into the surface 11 (such as when subtractive techniques are utilized). For example, in some embodiments, the passive strain indicator 40 may comprise a thickness of less than from about 0.01 millimeters to greater than 1 millimeter. In some embodiments, the passive strain indicator 40 may have a substantially uniform thickness. Such embodiments may help facilitate more accurate measurements for subsequent strain calculations between the first and second reference points 41 and 42.

In some embodiments, the passive strain indicator 40 may comprise a positively applied square or rectangle wherein the first and second reference points 41 and 42 comprise two opposing sides of said square or rectangle. In other embodiments, the passive strain indicator 40 may comprise at least two applied reference points 41 and 42 separated by a negative space 45 (i.e., an area in which the passive strain indicator material is not applied). The negative space 45 may comprise, for example, an exposed portion of the exterior surface 11 of the component 10. Alternatively or additionally, the negative space 45 may comprise a subsequently applied visually contrasting material that is distinct from the material of the at least two reference points 41 and 42 (or vice versa).

As illustrated in FIG. 2, in some embodiments, each passive strain indicator 40 may include a unique identifier 47 (hereinafter "UID"). The UID 47 may comprise any type of barcode, label, tag, serial number, pattern or other identifying system that facilitates the identification of that particular passive strain indicator 40. In some embodiments, the UID 47 may additionally or alternatively comprise information about the component 10 or the overall assembly, such as a turbine or other assembly, that the passive strain indicator 40 is deposited on. The UID 47 may thereby assist in the identification and tracking of particular passive strain indicators 40, components 10 or even overall assemblies to help correlate measurements for past, present and future operational tracking.

The passive strain indicator 40 may thereby be configured in one or more of a variety of locations of various components 10. For example, as discussed above, the passive strain indicator 40 may be configured on a bucket, blade, vane, nozzle, shroud, rotor, transition piece or casing. In such embodiments, the passive strain indicator 40 may be configured in one or more locations known to experience various forces during unit operation such as on or proximate airfoils, platforms, tips or any other suitable location. Moreover, the passive strain indicator 40 may be deposited in one or more locations known to experience elevated temperatures. For example the passive strain indicator 40 may be configured on a hot gas path or combustion component 10.

In some embodiments, multiple passive strain indicators 40 may be configured on a single component 10 or on multiple components 10. For example, a plurality of passive strain indicators 40 may be configured on a single component 10 at various locations such that the strain may be determined at a greater number of locations about the individual component 10. Alternatively or additionally, a plurality of like components 10 may each have one or more passive strain indicator 40 configured in standard locations so that the amount of strain experienced by each specific component 10 may be compared to other like components 10. In some embodiments, multiple different components 10 of the same unit may each have one or more passive strain indicators 40 configured thereon so that the amount of strain experienced at different locations within the overall unit may be determined.

It should be understood that the present disclosure is not limited to passive strain indicators as described herein, and rather that any suitable group of nodes or fiducials configured on the exterior surface of a component and which can be utilized for deformation analysis is within the scope and spirit of the present disclosure.

Referring now to FIGS. 3 through 9, various embodiments of systems 100 for monitoring component 10 deformation, along with various methods 300 for monitoring component 10 deformation, are provided. Such systems 100 and methods 300 in accordance with the present disclosure advantageously facilitate improved component 10 and passive strain indicator 40 analysis by directly measuring the component 10 and associated passive strain indicators 40 along three axes (conventionally termed as an X-axis, Y-axis and Z-axis and which are mutually orthogonal). Systems 100 and methods 300 in accordance with the present disclosure generally utilize surface metrology techniques to obtain direct measurements of passive strain indicators 40 along three axes. In particular, non-contact surface metrology techniques may be utilized in exemplary embodiments. Because direct measurements along three axes can be performed in accordance with the present disclosure, inferred measurements along an axis based on contrast in two-dimensional images are advantageously not required, and the associated inaccuracies of such inferred measurements are avoided.

Figure 3:
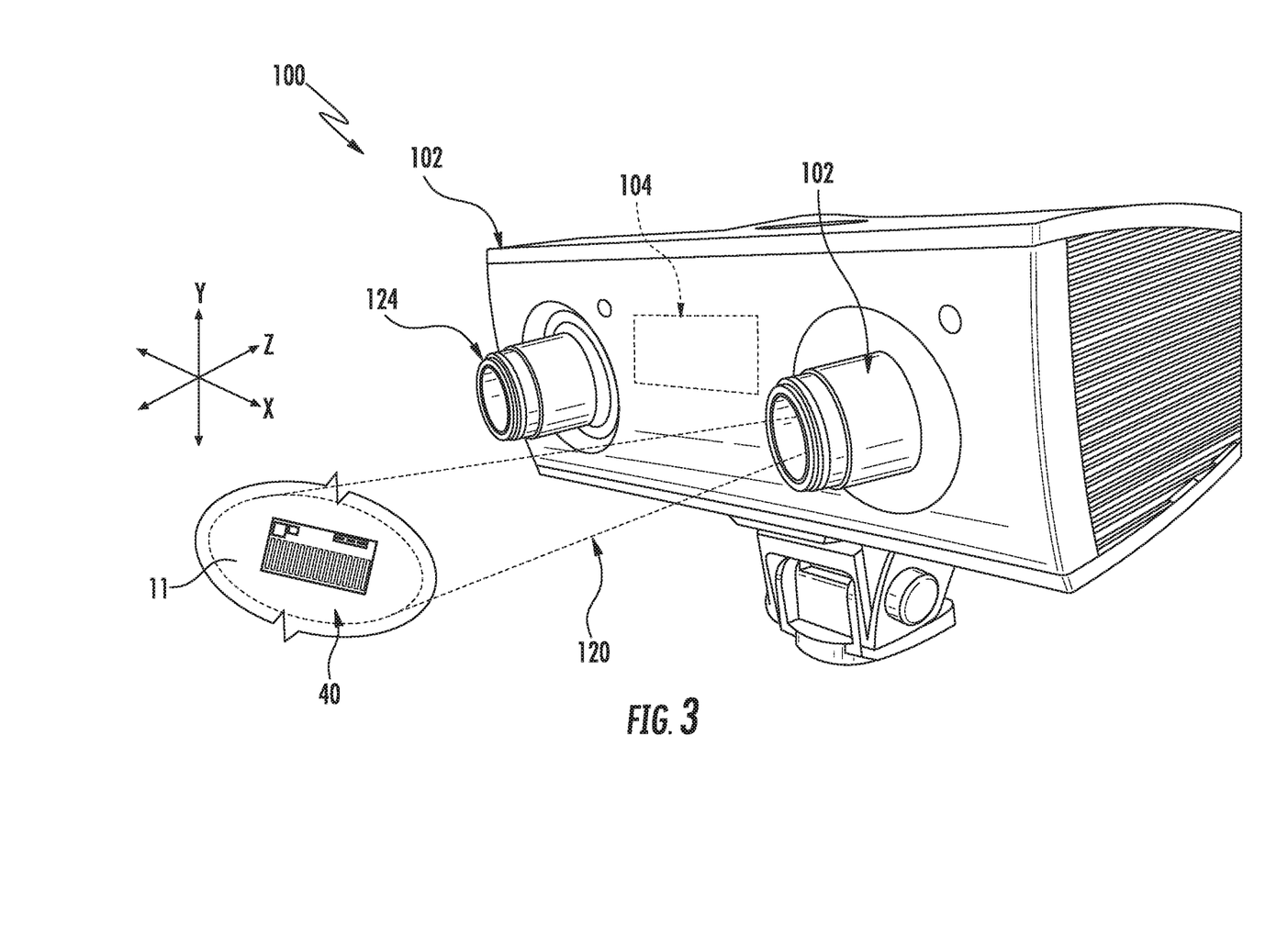
FIG. 3 is a perspective view of a system for monitoring a component in accordance with embodiments of the present disclosure.

System 100 may include, for example, a component 10 and the one or more passive strain indicators 40 which are configured on the exterior surface 11 of the component 10. Further, system 100 may include one or more three-dimensional data acquisition devices 102 for analyzing the turbine component 10 and one or more passive strain indicators 40, and a processor 104 in operable communication with the one or more three-dimensional data acquisition devices 102.

In general, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Processor 104 may also include various input/output channels for receiving inputs from and sending control signals to various other components with which the processor is in communication, such as the three-dimensional data acquisition device 102. Processor 104 may further include suitable hardware and/or software for storing and analyzing inputs and data from the three-dimensional data acquisition device 102, and for generally performing method steps as described herein.

Notably, processor 104 or components thereof may be integrated within three-dimensional data acquisition devices 102, and/or processor 104 or components thereof may be separate from the three-dimensional data acquisition devices 102. In exemplary embodiments, for example, processor 104 includes components that are integrated within the one or more three-dimensional data acquisition devices 102 for initially processing data received by the three-dimensional data acquisition device(s) 102, and components that are separate from the three-dimensional data acquisition device(s) 102 for assembling three-dimensional profiles 50 from the data and comparing these profiles.

In general, processor 104 is operable for directly measuring the passive strain indicators 40 along an X-axis, a Y-axis and a Z-axis to obtain data points, each of which includes an X-axis coordinate, Y-axis coordinate, and Z-axis coordinate. As discussed, the axes are mutually orthogonal. The X-axis coordinates, Y-axis coordinates, and Z-axis coordinates are dimensional data point components related to the direct measurement of the component 10 and passive strain indicators 40. For example, the data points may indicate the location of the exterior surface 11 and the surface of each passive strain indicators 40 along the various axes in space and relative to each other.

Systems in accordance with the present disclosure may facilitate improved local and global deformation analysis. By scanning the component 10 and passive strain indicators 40 thereof at initial and subsequent times, e.g., before and after deformation events such as creep, fatigue, and overloads, the component 10 may be monitored for, e.g. stress and/or strain. The one or more three-dimensional data acquisition devices 102 may be operable to perform initial and subsequent three-dimensional scans of the component 10. The three-dimensional scans of the component 10 each produce three-dimensional data and permits three-dimensional deformation analysis. Exemplary embodiments of such three-dimensional data may include polygon mesh data within three-dimensional point clouds, including coordinates in a three-dimensional space defined by the mutually orthogonal axes X, Y, and Z. Such three-dimensional data may then be input to deformation analysis algorithms to calculate regional surface strain.

In general, any suitable three-dimensional data acquisition device 102 which utilizes surface metrology techniques to obtain direct measurements in three dimensions may be utilized. In exemplary embodiments, device 102 is a non-contact device which utilizes non-contact surface metrology techniques.

For example, in exemplary embodiments, a three-dimensional data acquisition device 102 may be a suitable optical scanner which optically identifies passive strain indicators 40 in three dimensions. FIG. 3 illustrates an exemplary embodiment of an optical scanner in accordance with the present disclosure, wherein the scanner is a structured light scanner. Structured light scanners generally emit light 120 from an emitter 122 such as a light-emitting diode or other suitable light generating apparatus. In exemplary embodiments, the emitted light 120 utilized by a structured light scanner is blue light or white light. In general, the emitted light 120 is projected onto the passive strain indicators 40 and component 10 generally in a particular pattern. When the light 120 contacts the passive strain indicators 40 and component 10, the surface contour of the component and passive strain indicators 40 distorts the light 120. This distortion may be captured by a detector after the structured light is reflected by the outer surface, e.g., in an image taken by a detector or camera 124. The image of the light 120 contacting the component 10 and passive strain indicators 40 is received by, for example, the processor 104. The processor 104 then calculates data points which include X-axis coordinates, Y-axis coordinates, and Z-axis coordinates based on the received images by, for example, comparing the distortions in the light pattern to the expected pattern. Notably, in exemplary embodiments the processor 104 operates such optical scanners to perform various above disclosed steps.

Alternatively, other suitable data acquisition devices 102 may be utilized. For example, in some embodiments, device 102 is a laser scanner. Laser scanners generally include lasers which emit light in the form of laser beams towards objects, such as in these embodiments passive strain indicators 40 and components 10 generally. The light is then detected by a sensor of the device 102. For example, in some embodiments, the light is then reflected off of surfaces which it contacts, and received by a sensor of the device 102. The round-trip time for the light to reach the sensor is utilized to determine measurements along the various axes. These devices are typically known as time-of-flight devices. In other embodiments, the sensor detects the light on the surface which it contacts, and determines measurements based on the relative location of the light in the field-of-view of the sensor. These devices are typically known as triangulation devices. Data points which include X-axis, Y-axis and Z-axis coordinates are then calculated based on the detected light, as mentioned. Notably, in exemplary embodiments processor 104 performs and operates such data acquisition devices 102 to perform various above disclosed steps.

In some embodiments, the light emitted by a laser is emitted in a band which is only wide enough to reflect off a portion of object to be measured, such as the plurality of passive strain indicators 40. In these embodiments, a stepper motor or other suitable mechanism for moving the laser may be utilized to move the laser and the emitted band as required until light has been reflected off of the entire object to be measured.

Referring now to FIGS. 4 through 9, the present disclosure is further directed to methods 300 for monitoring components 10. As discussed, component 10 may include a body having an exterior surface 11. A plurality of passive strain indicators 40 may be configured on the exterior surface 11. Method 300 may, in some embodiments, include the step 310 of providing such a component 10, such as described herein.

Figure 4:
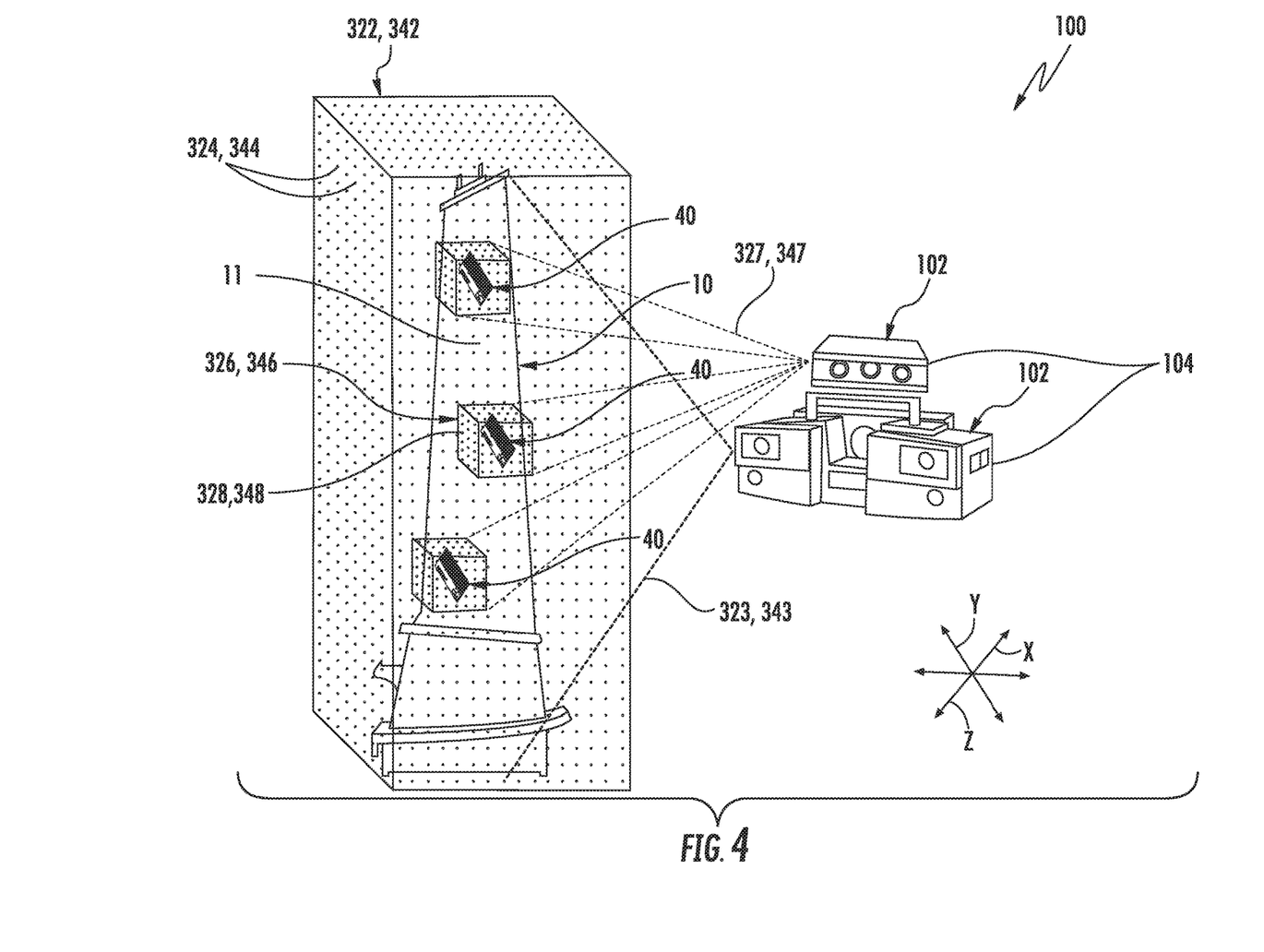
FIG. 4 illustrates the fields of view of devices of a system and corresponding point clouds during monitoring of a component in accordance with embodiments of the present disclosure.
Figure 5:
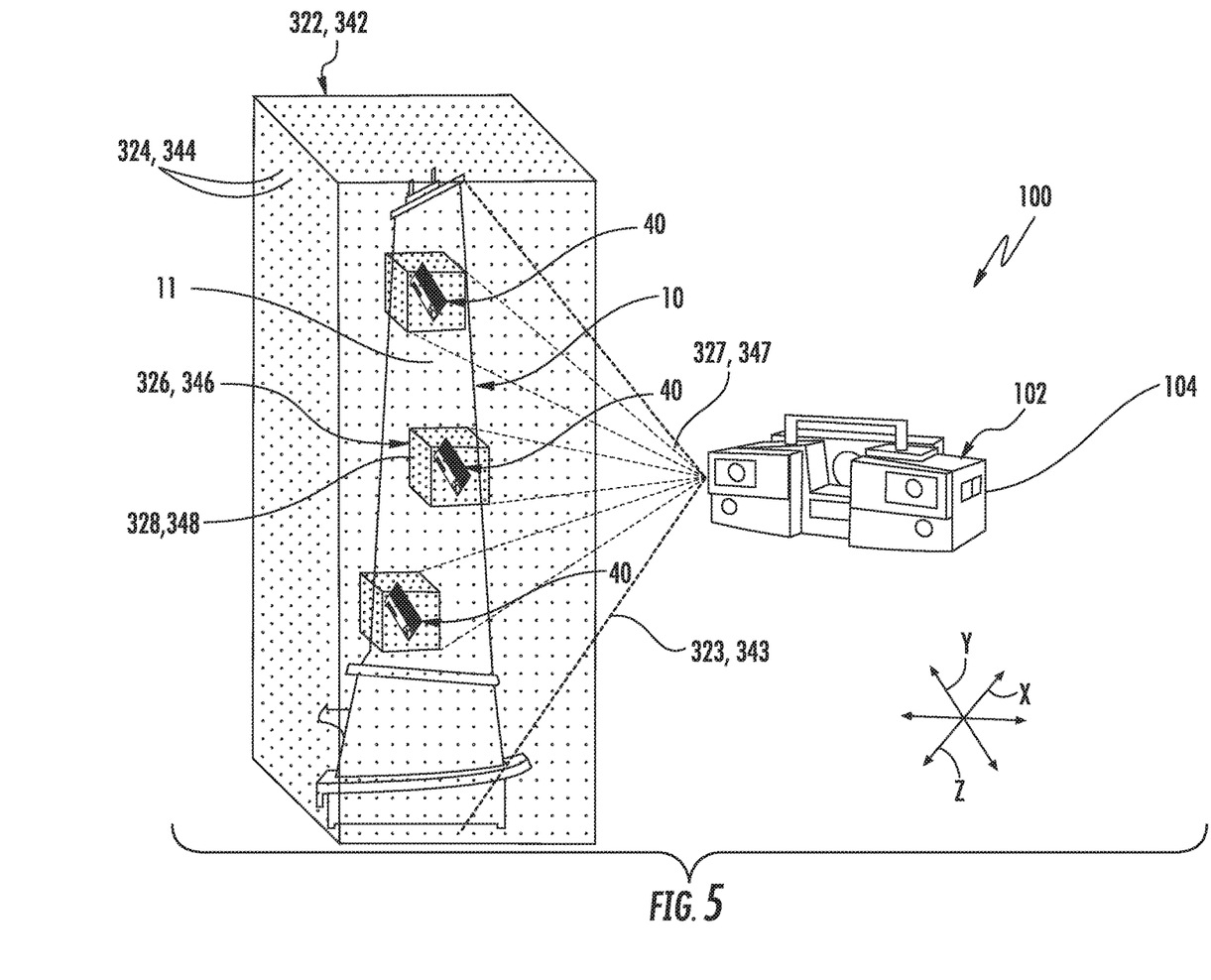
FIG. 5 illustrates the fields of view of a device of a system and corresponding point clouds during monitoring of a component in accordance with embodiments of the present disclosure.

A method 300 in accordance with the present disclosure may further include, for example, the step 320 of directly measuring the component 10 (and the passive strain indicators 40 configured thereon). Such direct measurement may be performed by at least one, such as one or more, three-dimensional data acquisition device 102. As discussed herein, in some embodiments as shown in FIG. 5 a single three-dimensional data acquisition device 102 may be utilized, and the single three-dimensional data acquisition device 102 may be in communication with processor 104. In other embodiments as shown in FIG. 4, a plurality of three-dimensional data acquisition devices 102 (including for example a first three-dimensional data acquisition device 102 and a second three-dimensional data acquisition device 102 as shown) may be utilized, and each of the plurality of three-dimensional data acquisition devices 102 may be in communication with processor 104.

Figure 6:
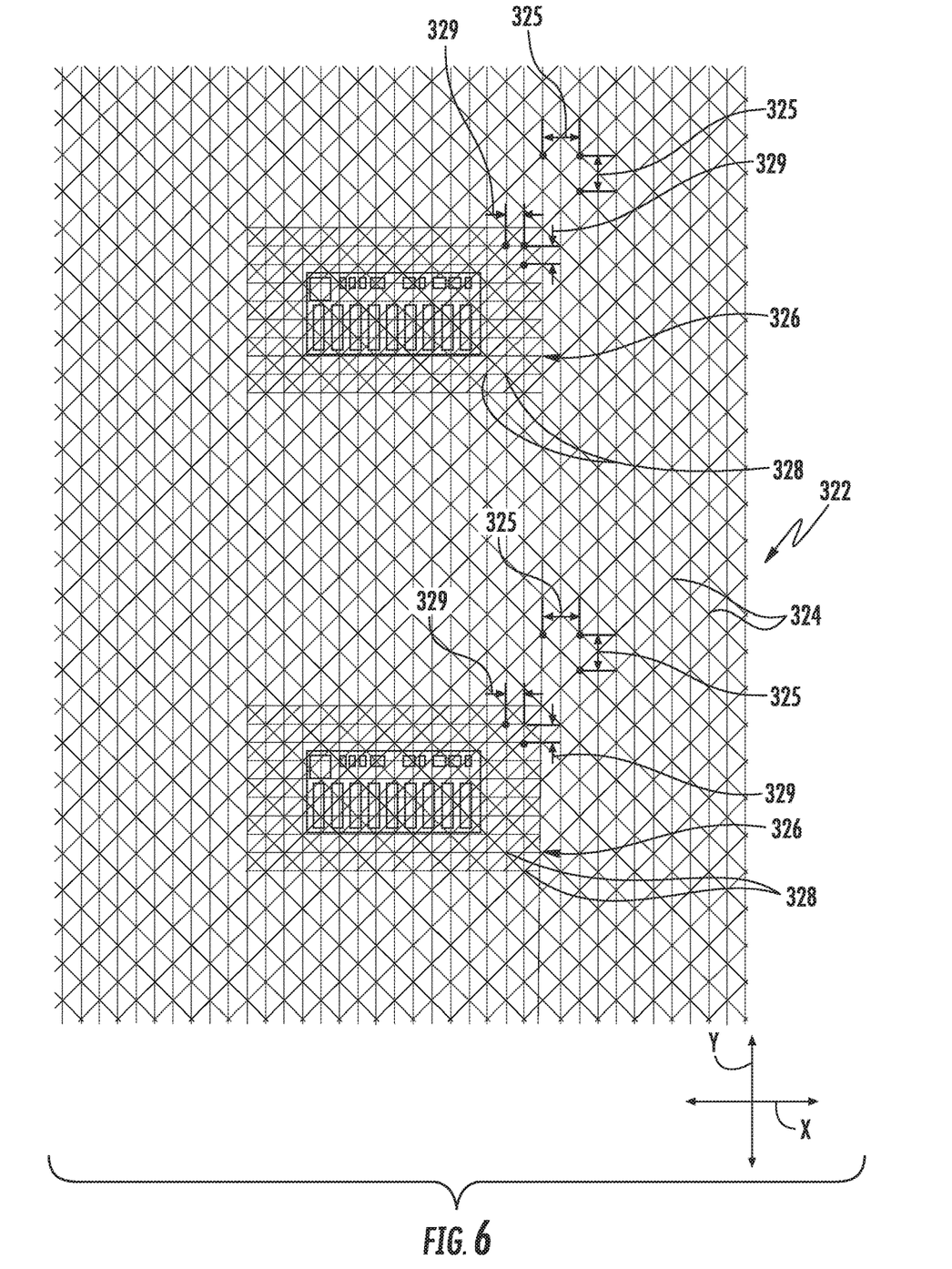
FIG. 6 illustrates portions of point clouds of a component generated by an initial direct measurement in accordance with embodiments of the present disclosure.

The direct measurement as discussed herein may generate a first point cloud 322 and a plurality of second point clouds 326. The first point cloud 322 may correspond to the exterior surface 11 and include a plurality of first data points 324. As discussed herein, each first data point 324 may include an X-axis coordinate, a Y-axis coordinate, and a Z-axis coordinate. By corresponding to the exterior surface 11, the first point cloud 322 corresponds to all data points within a data acquisition device 102 field of view 323 that includes the component 10 or a portion thereof and results in generation of first data points 324, the field of view 323 including more than one passive strain indicator 40 and being larger than each data acquisition device 102 field of view 327 that includes only a single passive strain indicator 40 and results in generation of second data points 328. Each second point cloud 326 may correspond to one of the plurality of passive strain indicators 40 (and exterior surface thereof) and include a plurality of second data points 328. As discussed herein, each second data point 328 may include an X-axis coordinate, a Y-axis coordinate, and a Z-axis coordinate. By corresponding to a passive strain indicator 40, a second point cloud 326 corresponds to all data points within a data acquisition device 102 field of view 327 that includes only a single passive strain indicator 40 and results in generation of second data points 328, the field of view 327 being smaller than the data acquisition device 102 field of view 323 that includes the component 10 or a portion thereof and results in generation of first data points 324.

The first point cloud 322 and second point clouds 326 may be obtained simultaneously during the direct measurement step 320. For example, processor 104 may cause execution of the direct measurement step 320 by instructing the one or more three-dimensional data acquisition devices 102 to perform the direct measurements. Further, generation of the first point cloud 322 and second point clouds 326 may be performed by the processor 104. The second point clouds 326 may each be embedded in the first point cloud 322, such that the location and area of each second point cloud 326 with the first point cloud 322 can be determined.

In some embodiments, the first point cloud 322 may include between 8 million and 16 million, such as between 12 million and 16 million, such as between 14 million and 16 million, first data points 324, and each second point cloud 326 may include between 8 million and 16 million, such as between 12 million and 16 million, such as between 14 million and 16 million, second data points 328. Alternatively, any suitable number of first and second data points may be generated.

Notably, a second data point 328 density of each second point cloud 326 may be greater than a first data point 324 density of the first point cloud 322. In other words, a distance 325 between neighboring first data points 324 may be greater than a distance 329 between neighboring second data points 328. In some embodiments, a first data point 324 resolution of the first point cloud 322 may be equal to a second data point 328 resolution of each second point cloud 326. In these embodiments, the same number of data points may be included in the first point cloud 322 as in each of the second point clouds 326. Alternatively, however, the first data point 324 resolution of the first point cloud 322 may be less than or greater than the second data point 328 resolution of each second point cloud 326.

As mentioned, in some embodiments, as shown in FIG. 5, a single three-dimensional data acquisition device 102 may be utilized. In these embodiments, the direct measurement which generates both the first point cloud 322 and the second point clouds 326 is performed by the single three-dimensional data acquisition device 102. In other embodiments, as shown in FIG. 4, a plurality of three-dimensional data acquisition devices 102 (including for example a first three-dimensional data acquisition device 102 and a second three-dimensional data acquisition device 102 as shown) may be utilized. In these embodiments, the direct measurement which generates the first point cloud 322 is performed by a first one of the three-dimensional data acquisition devices 102. The direct measurement which generates the second point cloud 326 is performed by a second one (or multiple second ones) of the three-dimensional data acquisition devices 102.

As discussed, first and second point clouds 322, 326 may be generated, such as by the processor 104, after direct measurement of the component 10 and associated passive strain indicators 40. Further, the first and second point clouds 322, 324 may be compared with point clouds taken at different times in order to monitor deformation of the component 10. For example, differences between the locations of the component 10, passive strain indicators 40 and/or various features thereof, as quantified by the X-axis coordinate, a Y-axis coordinate, and/or Z-axis coordinate of one or more first data points 324 and/or second data points 328, and the locations of the component 10, those passive strain indicators 40 and/or various features thereof, as quantified by the X-axis coordinate, a Y-axis coordinate, and/or Z-axis coordinate of one or more third data points and/or fourth data points taken at a different time as discussed herein, may be observed and measured for use in deformation calculations (such as strain calculations) to determine if component 10 deformation has occurred.

For example, the first point cloud 322 and second point clouds 326 may be generated based on direct measurements which occur at a first or initial time, such that step 320 includes initially measuring the component 10 at the first or initial time. As discussed herein, a third point cloud and a plurality of fourth point clouds may be generated based on direct measurements which occur at a second or subsequent time after the first or initial time, such that this step includes subsequently measuring the component 10 at the second or subsequent time. First time may occur before use in service in a turbomachine or other operation, such as before the component has been subjected to any duty cycles, or may occur after a certain amount of such operation such that the component has been subjected to one or more duty cycles. Second time may occur after first time and after a certain amount of such operation, such that the component has been subjected to one or more duty cycles since first time occurred. For example, a first time may be zero, for a newly manufactured component 10, and a second time may occur after a particular period of time of service of the component 10. By directly measuring the component 10 and passive strain indicators 40 at these varying times, deformation, etc. and resulting strain due to use of the component 10 in service may be calculated.

Accordingly, method 300 may further include the step 330 of subjecting the component 10 to at least one duty cycle. Such step 330 may occur after the step 320 of initially directly measuring the component 10.

Method 300 may further include the step 340 of subsequently directly measuring the component 10 (and the passive strain indicators 40 configured thereon) with the at least one data acquisition device 100. Such step may occur after step 320 and after step 330. Such direct measurement may be performed by the at least one, such as one or more, three-dimensional data acquisition device 102, as discussed herein in the context of step 320.

Figure 7:
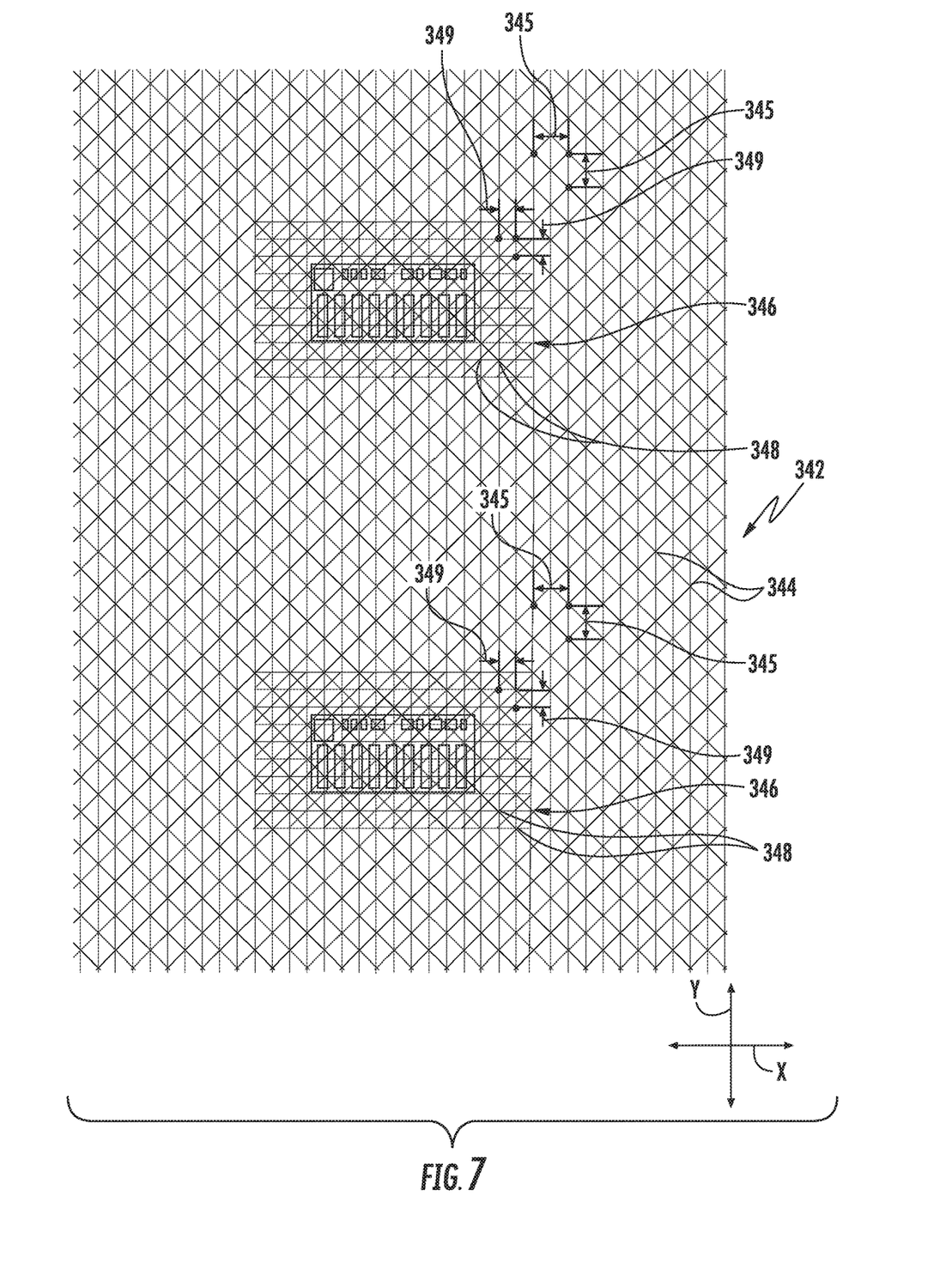
FIG. 7 illustrates portions of point clouds of a component generated by a subsequent direct measurement in accordance with embodiments of the present disclosure.
Figure 8:
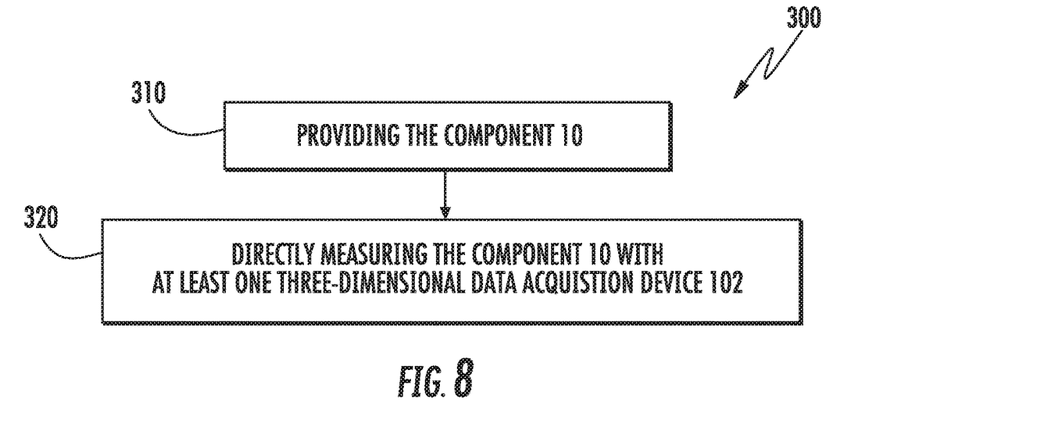
FIG. 8 is a flow chart illustrating a method in accordance with embodiments of the present disclosure.
Figure 9:
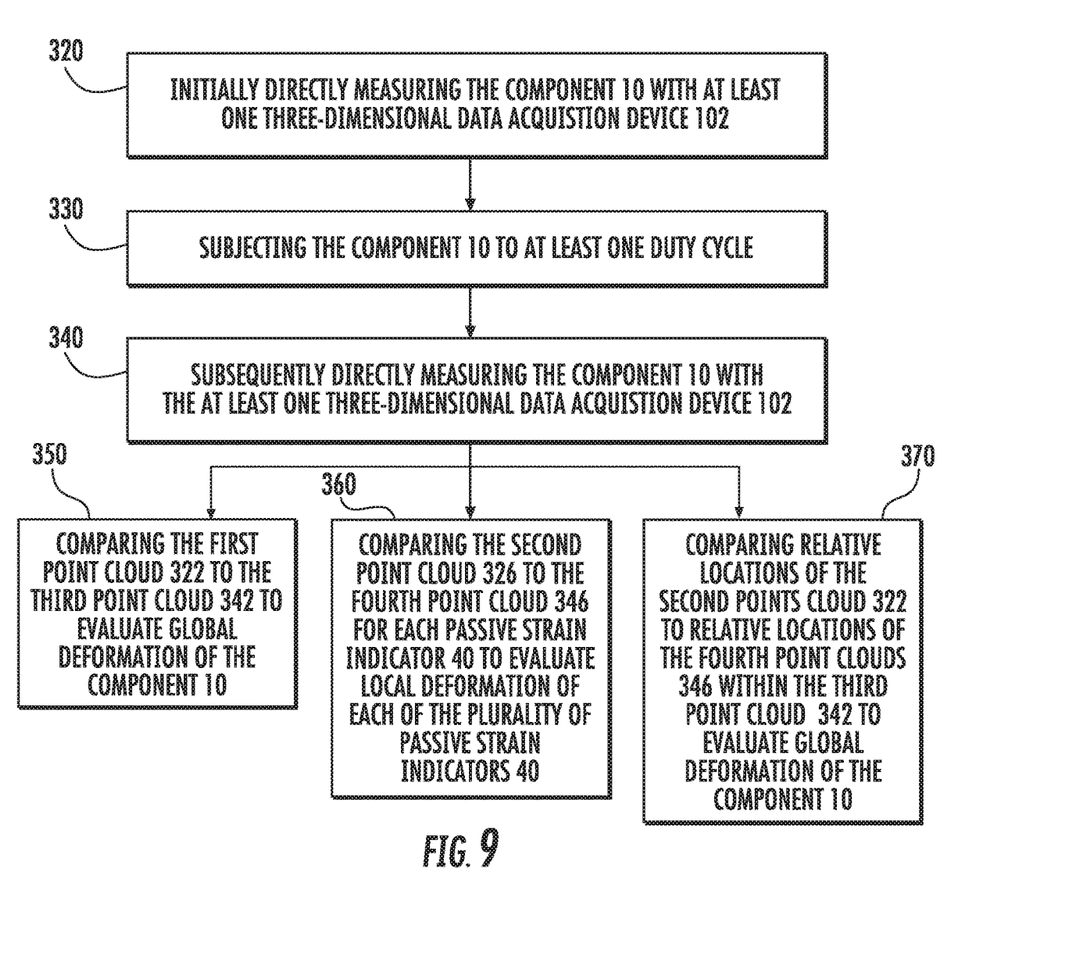
FIG. 9 is a flow chart illustrating a method in accordance with embodiments of the present disclosure.

The direct measurement as discussed herein may generate a third point cloud 342 and a plurality of fourth point clouds 346. The third point cloud 342 may correspond to the exterior surface 11 and include a plurality of third data points 344. As discussed herein, each third data point 344 may include an X-axis coordinate, a Y-axis coordinate, and a Z-axis coordinate. By corresponding to the exterior surface 11, the third point cloud 342 corresponds to all data points within a data acquisition device 102 field of view 343 that includes the component 10 or a portion thereof and results in generation of third data points 344, the field of view 343 including more than one passive strain indicator 40 and being larger than each data acquisition device 102 field of view 347 that includes only a single passive strain indicator 40 and results in generation of fourth data points 348. Each fourth point cloud 346 may correspond to one of the plurality of passive strain indicators 40 (and exterior surface thereof) and include a plurality of fourth data points 348. As discussed herein, each fourth data point 348 may include an X-axis coordinate, a Y-axis coordinate, and a Z-axis coordinate. By corresponding to a passive strain indicator 40, a fourth point cloud 346 corresponds to all data points within a data acquisition device 102 field of view 347 that includes only a single passive strain indicator 40 and results in generation of fourth data points 348, the field of view 347 being smaller than the data acquisition device 102 field of view 343 that includes the component 10 or a portion thereof and results in generation of third data points 344.

The third point cloud 342 and fourth point clouds 346 may be obtained simultaneously during the direct measurement step 340. For example, processor 104 may cause execution of the direct measurement step 340 by instructing the one or more three-dimensional data acquisition devices 102 to perform the direct measurements. Further, generation of the third point cloud 342 and fourth point clouds 346 may be performed by the processor 104. The fourth point clouds 346 may each be embedded in the third point cloud 342, such that the location and area of each fourth point cloud 346 with the third point cloud 342 can be determined.

In some embodiments, the third point cloud 342 may include between 8 million and 16 million, such as between 12 million and 16 million, such as between 14 million and 16 million, third data points 344, and each fourth point cloud 346 may include between 8 million and 16 million, such as between 12 million and 16 million, such as between 14 million and 16 million, fourth data points 348. Alternatively, any suitable number of third and fourth data points may be generated.

Notably, a fourth data point 348 density of each fourth point cloud 346 may be greater than a third data point 344 density of the third point cloud 342. In other words, a distance 345 between neighboring third data points 344 may be greater than a distance 349 between neighboring fourth data points 348. In some embodiments, a third data point 344 resolution of the third point cloud 342 may be equal to a fourth data point 348 resolution of each fourth point cloud 346. In these embodiments, the same number of data points may be included in the third point cloud 342 as in each of the fourth point clouds 346. Alternatively, however, the third data point 344 resolution of the third point cloud 342 may be less than or greater than the fourth data point 348 resolution of each fourth point cloud 346.

As mentioned, in some embodiments, as shown in FIG. 5, a single three-dimensional data acquisition device 102 may be utilized. In these embodiments, the direct measurement which generates both the third point cloud 342 and the fourth point clouds 346 is performed by the single three-dimensional data acquisition device 102. In other embodiments, as shown in FIG. 4, a plurality of three-dimensional data acquisition devices 102 (including for example a first three-dimensional data acquisition device 102 and a second three-dimensional data acquisition device 102 as shown) may be utilized. In these embodiments, the direct measurement which generates the third point cloud 342 is performed by a first one of the three-dimensional data acquisition devices 102. The direct measurement which generates the fourth point cloud 346 is performed by a second one (or multiple second ones) of the three-dimensional data acquisition devices 102.

In exemplary embodiments, identical field of view and resolution settings are utilized for the first and third point clouds 322, 342 and for the second and fourth point clouds 326, 346. This facilitates comparison of the various points clouds and data points thereof as discussed herein, such as for deformation monitoring purposes. For example, in exemplary embodiments, in some embodiments, the first data point 324 density and the third data point density 344 may be identical. Further, in some embodiments, the second data point 328 density and the fourth data point density 348 for each passive strain indicator 40 may be identical.

As discussed, differences between the locations of the component 10, passive strain indicators 40 and/or various features thereof, as quantified by the X-axis coordinate, a Y-axis coordinate, and/or Z-axis coordinate of one or more first data points 324 and/or second data points 328, and the locations of the component 10, those passive strain indicators 40 and/or various features thereof, as quantified by the X-axis coordinate, a Y-axis coordinate, and/or Z-axis coordinate of one or more third data points 344 and/or fourth data points 348 taken at a different time as discussed herein, may be observed and measured for use in deformation calculations (such as strain calculations) to determine if component 10 deformation has occurred.

For example, in some embodiments, method 300 includes the step 350 of comparing the first point cloud 322 to the third point cloud 342 to evaluate global deformation of the component 10. In such evaluation, differences between the location of component 10 features (such as the outer periphery of the component 10, the locations of the passive strain indicators 40 on the component 10, etc.) are compared via comparison of the X-axis coordinate, a Y-axis coordinate, and/or Z-axis coordinate of one or more first data points 324 corresponding to these features with the X-axis coordinate, a Y-axis coordinate, and/or Z-axis coordinate of one or more third data points 344 corresponding to these features.

Additionally or alternatively, in some embodiments, method 300 includes the step 360 of comparing the second point cloud 326 to the fourth point cloud 346 for one or more of the plurality of passive strain indicators 40 to evaluate local deformation of each of these passive strain indicators 40 (and thus evaluate deformation of the component 10). In such evaluation, differences between the location of passive strain indicators 40 features are compared via comparison of the X-axis coordinate, a Y-axis coordinate, and/or Z-axis coordinate of one or more second data points 328 corresponding to these features with the X-axis coordinate, a Y-axis coordinate, and/or Z-axis coordinate of one or more fourth data points 348 corresponding to these features.

Additionally or alternatively, in some embodiments, method 300 includes the step 370 of comparing relative locations of two or more second point clouds 326 (i.e. the distances between corresponding locations such as centroids or outer peripheral points) within the first point cloud 322 to relative locations of two or more corresponding fourth point clouds 346 (i.e. the distances between corresponding locations such as centroids or outer peripheral points) within the third point cloud 342 to evaluate global deformation of the component 10. In such evaluation, differences in location of one or more passive strain indicators 40 on the component 10 are compared via comparison of the X-axis coordinate, a Y-axis coordinate, and/or Z-axis coordinate of one or more first data points 324 (corresponding to the location of the second point cloud 326) with the X-axis coordinate, a Y-axis coordinate, and/or Z-axis coordinate of one or more third data points 344 (corresponding to the location of the fourth point cloud 346).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of monitoring a component, the method comprising:
   providing the component, the component comprising a body having an exterior surface and a plurality of passive strain indicators configured on the exterior surface;
   initially directly measuring the component with at least one three-dimensional data acquisition device, wherein the initial direct measurement generates a first point cloud and a plurality of second point clouds, the first point cloud corresponding to the exterior surface and comprising a plurality of first data points, each data point having an X-axis coordinate, a Y-axis coordinate, and a Z-axis coordinate, each second point cloud corresponding to one of the plurality of passive strain indicators and comprising a plurality of second data points, each data point having an X-axis coordinate, a Y-axis coordinate, and a Z-axis coordinate, wherein a second data point density of each second point cloud is greater than a first data point density of the first point cloud;
   subjecting the component to at least one duty cycle;
   subsequently directly measuring the component with the at least one three-dimensional data acquisition device, wherein the subsequent direct measurement generates a third point cloud and a plurality of fourth point clouds, the third point cloud corresponding to the exterior surface and comprising a plurality of third data points, each data point having an X-axis coordinate, a Y-axis coordinate, and a Z-axis coordinate, each fourth point cloud corresponding to one of the plurality of passive strain indicators and comprising a plurality of fourth data points, each data point having an X-axis coordinate, a Y-axis coordinate, and a Z-axis coordinate, wherein a fourth data point density of each fourth point cloud is greater than a third data point density of each third point cloud;
   comparing the first point cloud to the third point cloud to evaluate global deformation of the component, wherein differences between the location of exterior surface features are monitored via the comparison of the X-axis coordinate, the Y-axis coordinate, and the Z-axis coordinate of the first data points corresponding to the exterior surface features with the X-axis coordinate, the Y-axis coordinate, and the Z-axis coordinate of the third data points corresponding to the exterior surface features; and
   comparing the second point cloud to the fourth point cloud for each passive strain indicator to evaluate local deformation of each of the plurality of passive strain indicators wherein differences between the location of passive strain indicators features are monitored via the comparison of the X-axis coordinate, the Y-axis coordinate, and the Z-axis coordinate of the second data points corresponding to the passive strain indicator features with the X-axis coordinate, the Y-axis coordinate, and the Z-axis coordinate of the fourth data points corresponding to the passive strain indicator features.

2. The method of claim 1, wherein a first data point resolution of the first point cloud is equal to a second data point resolution of each of the plurality of second point clouds, and wherein a third data point resolution of the third point cloud is equal to a fourth data point resolution of each of the plurality of fourth point clouds.

3. The method of claim 1, wherein the first data point density and the third data point density are identical, and wherein the second data point density and the fourth data point density for each passive strain indicator are identical.

4. The method of claim 1, wherein the first point cloud includes between 8 million and 16 million first data points, each second point cloud includes between 8 million and 16 million second data points, the third point cloud includes between 8 million and 16 million third data points, and each fourth point cloud includes between 8 million and 16 million fourth data points.

5. The method of claim 1, further comprising comparing relative locations of the second point clouds within the first point cloud to relative locations of the fourth point clouds within the third point cloud to evaluate global deformation of the component.

6. The method of claim 1, wherein the at least one three-dimensional data acquisition device comprises a structured light scanner.

7. The method of claim 6, wherein structured light emitted by the structured light scanner is blue light.

8. The method of claim 1, wherein the at least one three-dimensional data acquisition device is a single three-dimensional data acquisition device.

9. The method of claim 1, wherein the at least one three-dimensional data acquisition device is a plurality of three-dimensional data acquisition devices, wherein the initial direct measurement which generates the first point cloud and the subsequent direct measurement which generates the third point cloud are performed by a first one of the plurality of three-dimensional data acquisition devices, and wherein the initial direct measurement which generates the second point cloud and the subsequent direct measurement which generates the fourth point cloud are performed by a second one of the plurality of three-dimensional data acquisition devices.

10. A method of monitoring a component, the method comprising:
    providing the component, the component comprising a body having an exterior surface and a plurality of passive strain indicators configured on the exterior surface; and
    directly measuring the component with at least one three-dimensional data acquisition device,
    wherein the direct measurement generates a first point cloud and a plurality of second point clouds, the first point cloud corresponding to the exterior surface and comprising a plurality of first data points, each data point having an X-axis coordinate, a Y-axis coordinate, and a Z-axis coordinate, each second point cloud corresponding to one of the plurality of passive strain indicators and comprising a plurality of second data points, each data point having an X-axis coordinate, a Y-axis coordinate, and a Z-axis coordinate, wherein a second data point density of each second point cloud is greater than a first data point density of each first point cloud, wherein the first point cloud and plurality of second point clouds are compared with corresponding point clouds measured at different times in order to monitor component deformation.

11. The method of claim 10, wherein a first data point resolution of the first point cloud is equal to a second data point resolution of each of the plurality of second point clouds.

12. The method of claim 10, wherein the at least one three-dimensional data acquisition device comprises a structured light scanner.

13. The method of claim 10, wherein the at least one three-dimensional data acquisition device is a single three-dimensional data acquisition device.

14. The method of claim 10, wherein the at least one three-dimensional data acquisition device is a plurality of three-dimensional data acquisition devices, wherein the direct measurement which generates the first point cloud is performed by a first one of the plurality of three-dimensional data acquisition devices, and wherein the direct measurement which generates the second point cloud is performed by a second one of the plurality of three-dimensional data acquisition devices.

15. The method of claim 10, wherein the component is a turbine component.

16. A system for monitoring a component, the system comprising:
- a component, the component comprising a body having an exterior surface and a plurality of passive strain indicators configured on the exterior surface;
- at least one three-dimensional data acquisition device, the at least one three-dimensional data acquisition device configured to directly measure the component; and
- a processor in operable communication with the at least one data acquisition device, the processor configured to generate a first point cloud and a plurality of second point clouds based on the direct measurement of the component, the first point cloud corresponding to the exterior surface and comprising a plurality of first data points, each data point having an X-axis coordinate, a Y-axis coordinate, and a Z-axis coordinate, each second point cloud corresponding to one of the plurality of passive strain indicators and comprising a plurality of second data points, each data point having an X-axis coordinate, a Y-axis coordinate, and a Z-axis coordinate, wherein a second data point density of each second point cloud is greater than a first data point density of the first point cloud, wherein the first point cloud and plurality of second point clouds are compared with corresponding point clouds measured at different times in order to monitor component deformation.

17. The system of claim 16, wherein a first data point resolution of the first point cloud is equal to a second data point resolution of each of the plurality of second point clouds.

18. The system of claim 16, wherein the at least one three-dimensional data acquisition device comprises a structured light scanner.

19. The system of claim 16, wherein the at least one three-dimensional data acquisition device is a single three-dimensional data acquisition device.

20. The system of claim 16, wherein the at least one three-dimensional data acquisition device is a plurality of three-dimensional data acquisition devices, wherein the direct measurement which generates the first point cloud is performed by a first one of the plurality of three-dimensional data acquisition devices, and wherein the initial direct measurement which generates the second point cloud is performed by a second one of the plurality of three-dimensional data acquisition devices.

* * * * *